(12) United States Patent
McNiff et al.

(10) Patent No.: US 7,302,054 B1
(45) Date of Patent: *Nov. 27, 2007

(54) SYSTEM AND METHOD FOR INTEGRATED TELEPHONY SWITCHING

(75) Inventors: Bradley J. McNiff, Auburn, NH (US); Cedric H. Druce, Basking Ridge, NJ (US)

(73) Assignee: Cisco Technology, Inc., San Jose, CA (US)

( * ) Notice: Subject to any disclaimer, the term of this patent is extended or adjusted under 35 U.S.C. 154(b) by 910 days.

This patent is subject to a terminal disclaimer.

(21) Appl. No.: 10/630,309

(22) Filed: Jul. 30, 2003

Related U.S. Application Data

(63) Continuation of application No. 09/479,395, filed on Jan. 6, 2000, now Pat. No. 6,611,591.

(51) Int. Cl.
*H04L 12/64* (2006.01)
*H04M 3/00* (2006.01)
*H04M 7/00* (2006.01)

(52) U.S. Cl. .................. 379/268; 370/352; 370/467; 379/219; 379/272

(58) Field of Classification Search ........ 370/352–356, 370/386, 466, 467; 379/219, 220.01, 242, 379/268, 269, 271, 272, 273, 291, 292, 306
See application file for complete search history.

(56) References Cited

U.S. PATENT DOCUMENTS

| | | | |
|---|---|---|---|
| 5,193,110 A | 3/1993 | Jones et al. | 379/93.14 |
| 6,075,784 A | 6/2000 | Frankel et al. | 370/356 |
| 6,154,465 A | 11/2000 | Pickett | 370/466 |
| 6,188,760 B1 | 2/2001 | Oran et al. | 379/230 |
| 6,333,931 B1 | 12/2001 | LaPier et al. | 370/385 |
| 6,339,594 B1 | 1/2002 | Civanlar et al. | 370/352 |
| 6,400,713 B1 | 6/2002 | Thomas et al. | 370/355 |
| 6,404,763 B1 | 6/2002 | Renucci et al. | 370/352 |
| 6,507,648 B1 | 1/2003 | Golka et al. | 379/221.07 |
| 6,611,591 B1 * | 8/2003 | McNiff et al. | 379/268 |

* cited by examiner

*Primary Examiner*—Harry S. Hong
(74) *Attorney, Agent, or Firm*—Baker Botts L.L.P.

(57) ABSTRACT

A telephony system includes a switch coupled to a call agent and a legacy application, and further coupled to resources, some controlled by the call agent and others controlled by the legacy application. The switch processes connection requests from the call agent and the legacy application, and, using a resource emulator as an intermediary, establishes connections between call agent controlled resources and legacy application controlled resources.

21 Claims, 3 Drawing Sheets

SYSTEM AND METHOD FOR INTEGRATED TELEPHONY SWITCHING

CROSS-REFERENCE TO RELATED APPLICATION

This application is a continuation of U.S. application Ser. No. 09/479,395 filed Jan. 6, 2000 now U.S. Pat. No. 6,611,591 by Bradley McNiff and Cedric Druce and entitled "System and Method for Integrated Telephony Switching".

TECHNICAL FIELD OF THE INVENTION

The present invention relates generally to telephony switching and more particularly to a system and method for integrated telephony switching.

BACKGROUND OF THE INVENTION

Telephony systems connect many different types of equipment having a variety of communication protocols, such as Internet protocol (IP) telephony devices and time division multiplexed (TDM) telephony devices. At the heart of telephony systems, switches provide the mechanism for connecting telephone calls. These switches interface with varied telephony devices using different communication protocols.

Modern telephony systems increasingly use both the traditional TDM protocols and IP communications. Newer telephony equipment often controls both IP and TDM trunks connected to switches linked to telephony networks. However, many legacy applications still interface with switches using equipment designed before the introduction of IP telephony. These applications do not recognize or understand modern protocols such as IP.

SUMMARY OF THE INVENTION

In accordance with the present invention, a system and method for integrated telephony switching is provided which substantially eliminates or reduces disadvantages and problems associated with previous systems and methods. In a particular embodiment, the present invention satisfies a need for a switch that integrates connections to legacy applications and modern applications using the same switching fabric.

According to one embodiment of the invention, an integrated telephony switching system includes a first application operable to control a first resource using a first protocol, a second application operable to control a second resource using a second protocol, and a hybrid switch. The hybrid switch includes a switching matrix coupled to the first resource and the second resource, a resource emulator, and a controller. The controller receives a first signal from the first application using the first protocol, the first signal comprising an origin indicating the first resource and a destination indicating the resource emulator. The controller also receives a second signal from the second application using the second protocol. The second signal comprising an origin indicating the resource emulator and a destination indicating the second resource. Furthermore, the controller connects the first resource and the second resource using the switching matrix.

In accordance with another embodiment of the present invention, a method for integrated telephony switching receives a first connection request from a first controller, the first connection request requesting a connection between a first resource coupled to a switching matrix and a resource emulation module. The method also receives a second connection request from a second controller, the second connection request requesting a connection between the resource emulation module and a second resource coupled to the switching matrix. The method also connects the first resource and the second resource using the switching matrix.

The invention provides a number of technical advantages. The system provides a method for connecting TDM and packet-based resources on a single switching matrix. The system also allows resources controlled by multiple applications connected to a single switch to be connected as though they were owned and controlled by a single application. Moreover, the system provides backward compatibility with legacy applications, allowing them to interface with modern equipment without the need for updates or upgrades.

Other technical advantages of the present invention will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

The preferred embodiments of the present invention and its advantages are best understood by referring now in more detail to FIGS. 1-5 of the drawings, in which like numerals refer to like parts.

Figure 1:
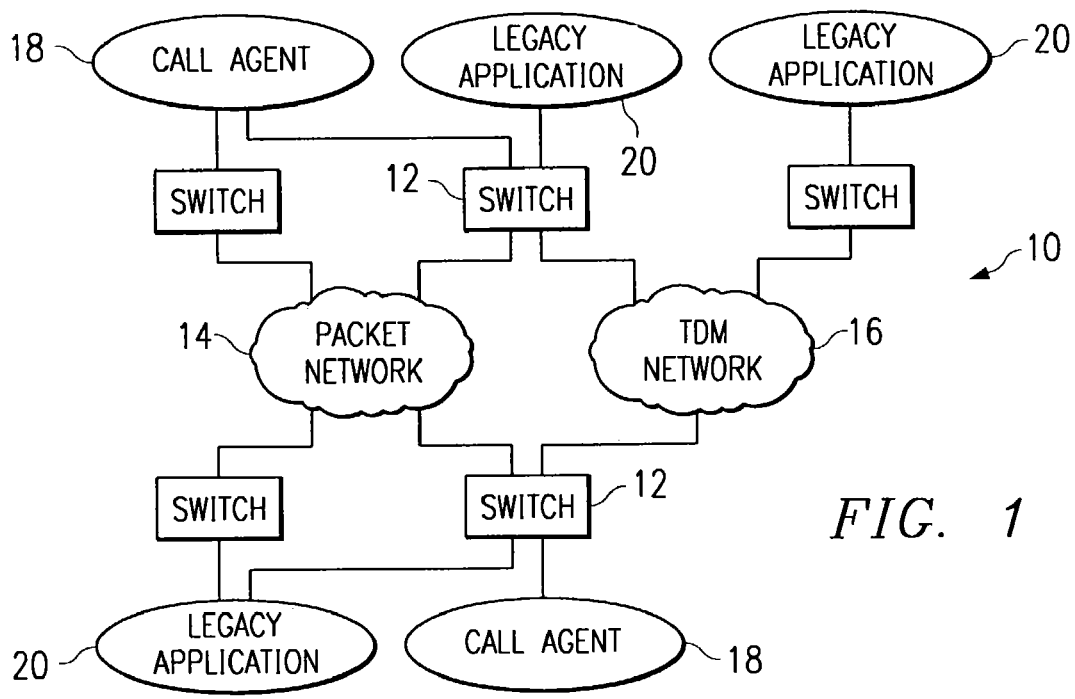
FIG. 1 is a block diagram illustrating a telephony system in accordance with the teachings of the present invention.

FIG. 1 illustrates a telephony system 10 that includes switches 12 coupled to a packet network 14, a TDM network 16, call agents 18, and legacy applications 20. In general, selected switches 12 in system 10 communicate with call agents 18 and legacy applications 20 to connect resources from packet network 14 and TDM network 16. Packet network 14 represents any collection and arrangement of hardware and/or software allowing packet-based communications between switches 12. For example, packet network 14 may be one or a collection of components associated with the public switched telephone network (PSTN), local area networks (LANs), wide area networks (WANs), a global computer network such as the Internet, or other suitable wireline or wireless communications technology that supports communication of data in packets. The term "packet" refers to any fixed or variable size grouping of data. Packet network 14 may use any one or combination of suitable packet-based transmission protocols, such as Internet protocol (IP), asynchronous transfer mode (ATM), X.25, transmission control protocol (TCP), user datagram protocol (UDP), and internetwork packet exchange/sequenced packet exchange (IPX/SPX). In general, transmission protocols may be any standard procedure for regulating transmissions between two devices and are not limited to packet or TDM protocols.

TDM network 16 represents any collection and arrangement of hardware and/or software allowing TDM-based communications between switches 12. For example, TDM network 16 may be one or a collection of components associated with the PSTN, LANs, WANs, or other suitable wireline or wireless communications technology. TDM network 16 may communicate information using any suitable transmission protocol for TDM signals. As mentioned, both packet network 14 and TDM network 16 may contain any number of telephony devices, including switches 12. Telephony devices may be any hardware and/or software capable of linking to telephony system 10, such as, switches, routers, telephones, computers, media gateways, mixed environment gateways, call centers, modems, cell phones, and wireless phones.

Call agent 18 represents any collection and arrangement of hardware and/or software for controlling telephony gateways, such as switches, mixed environment gateways, trunking gateways, voice over asynchronous transfer mode (VoATM) gateways, residential gateways, access gateways, business gateways, network access servers, circuit switches, packet switches, or any other telephony interface device. Legacy application 20 represents communications and/or processing equipment, hardware and/or software, for controlling resources coupled to TDM network 16.

According to one embodiment, switch 12 is connected to resources from both packet network 14 and TDM network 16. Legacy application 20 controls some of the resources from TDM network 16, and call agent 18 controls the resources from packet network 14 and some of the resources from TDM network 16. Switch 12 integrates telephony switching for call agents 18 and legacy applications 20 by connecting and disconnecting all of the connected resources as if they were controlled by a single application. In addition, switch 12 allows legacy applications 20 to connect packet resources and TDM resources using protocols and interfaces designed only for control of TDM resources.

Figure 2:
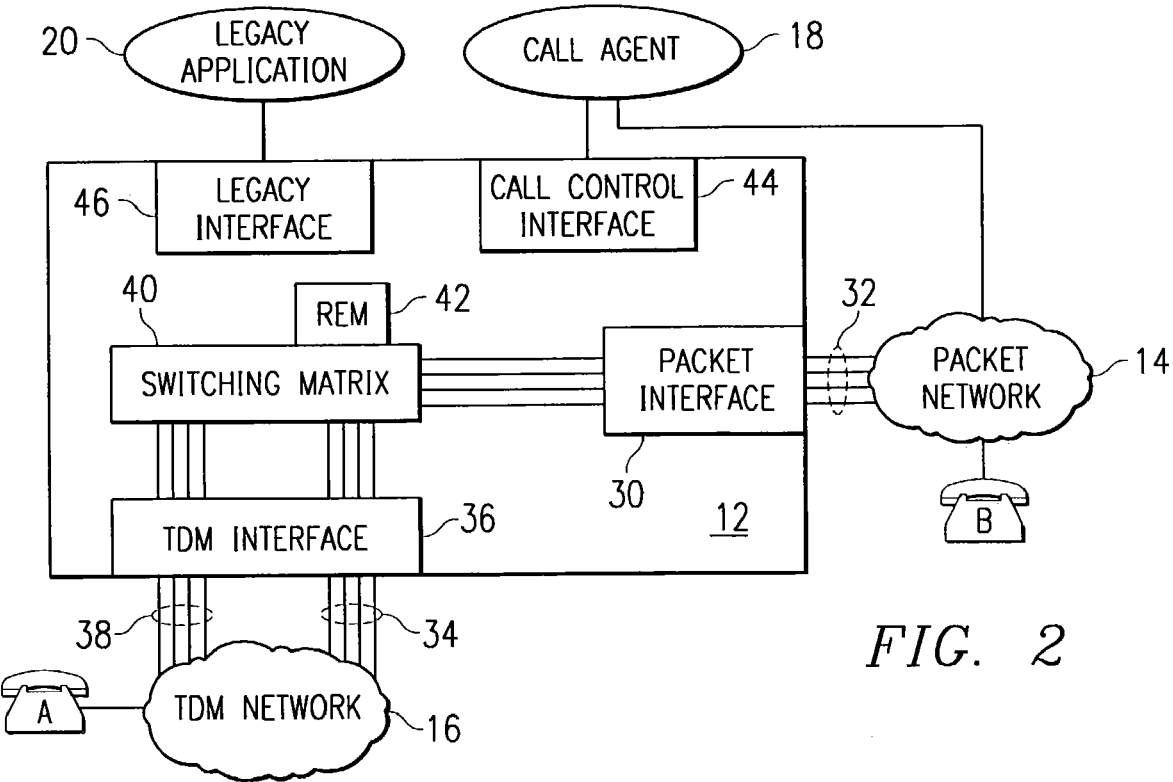
FIG. 2 is a block diagram illustrating connections of an exemplary switch in the telephony system.

FIG. 2 illustrates a detailed view of telephony system 10 that includes switch 12 coupled to packet network 14, TDM network 16, call agent 18, and legacy application 20. Switch 12 is coupled to packet network 14 using a packet interface 30 to interface with call agent controlled packet resources 32, and to TDM network 16 using a TDM interface 36 to interface with call agent controlled TDM resources 34 and legacy application controlled TDM resources 38. Also, switch 12 is coupled to call agent 18 using a call control interface 44 and legacy application 20 using a legacy interface 46. Within switch 12, a switching matrix 40 is coupled to packet interface 30, TDM interface 36, and a resource emulation module (REM) 42. In general, switch 12 establishes connections between packet resources and TDM resources as if these resources were controlled by a single application.

Packet interface 30, TDM interface 36, call control interface 44, and legacy interface 46 each interface with local and/or remote devices using any suitable transmission protocol. Legacy interface 46 may be any interface suitable for communicating with legacy applications 20 using an appropriate protocol, such as application program interfaces (APIs) specific to legacy application 20 coupled to switch 12. Legacy interface 46 provides backwards compatibility with applications not designed to operate with modern packet-enabled telephony networks. Call control interface 44 may be any interface suitable for communicating with call agents 18 using an appropriate protocol, such as Q.931, X.25, gateway control protocols (xGCP), IP device control (IPDC), simple gateway control protocol (SGCP), or other packet-enabled protocols.

Packet interface 30 provides connectivity between switch 12, packet network 14, and local packet-based devices coupled to switch 12. TDM interface 36 provides connectivity between switch 12, TDM network 16, and local TDM based devices coupled to switch 12. Both packet interface 30 and TDM interface 36 may also translate signals into a format suitable for switching matrix 40. Switching matrix 40 establishes links between resources coupled to switch 12. Switching matrix 40 establishes links by, for example, establishing a physical connection, establishing a virtual or software connection, switching timeslots, routing packets, or any other suitable technique for routing communications between resources coupled to switch 12. For example, switch 12 may translate communications with packet resources into timeslots capable of being switched with TDM resources. REM 42 emulates resources coupled to switching matrix 40, enabling connections between resources controlled by different applications without using additional physical connections, providing a significant technical advantage of switch 12.

In operation, switch 12 receives a connection request from a controlling application requesting a connection between resources controlled by the controlling application that are coupled to switch 12. Controlling applications control resources coupled to switch 12, for example, call agent 18 and legacy application 20. Telephony system 10 contemplates any number of controlling applications coupled to switch 12. Resources refer to links between switch 12 and telephony networks that are controlled by controlling applications, for example, call agent controlled packet resources 32, call agent controlled TDM resources 34, and legacy application controlled TDM resources 38. These resources may be devices, interfaces, physical or virtual connections that link switch 12 to telephony networks, such as packet network 14 or TDM network 16. These resource may include functionality for data transport, signaling, and/or other suitable telephony communications functions. Using REM 42, switch 12 allows a controlling application to connect one of its controlled resources to another resource as if that controlling application controlled both resources being connected. For example, call agent 18 signals a connection request between one of its controlled resource and REM 42, and legacy application 20 signals a connection request between REM 42 and one of its controlled resource. Based on these two connection requests, switch 12 establishes a link between the two controlled resources using switching matrix 40.

In a particular embodiment, call agent 18, using call control interface 44, controls connections between call agent controlled packet resources 32, call agent controlled TDM resources 34, and REM 42. REM 42 acts as a mediator between call agent 18 and resources controlled by other applications, allowing call agent 18 to connect its resources to legacy application controlled TDM resources 38 as if legacy application controlled TDM resources 38 were call agent controlled TDM resources 34. Similarly, using legacy interface 46, legacy application 20 controls connections between legacy application controlled TDM resources 38 and REM 42. For this case, REM 42 acts as a mediator between legacy application 20 and resources controlled by other applications, allowing legacy application 20 to connect legacy application controlled TDM resources 38 to call agent controlled packet resources 32 and call agent controlled TDM resources 34 as if those resources were legacy application controlled TDM resources 38.

In general, switch 12 establishes a connection between two resources controlled by different applications using REM 42 as a "virtual" resource for applications to connect with their resources. Switch 12 receives a signal from a first application requesting a connection between one of its controlled resources and REM 42, and receives a signal from a second application specifying a connection between REM 42 and one of its controlled resources. Based on these requests, switch 12 establishes a link between the first and second resources. Thus two signaling links are created, origin to REM 42 and REM 42 to destination, and one link is established, origin to destination, using switching matrix 40.

For example, consider a telephone call placed from the device labeled A connected to TDM network 16 (caller A) and the device labeled B connected to packet network 14 (called party B). Caller A is a TDM telephony device coupled to switch 12 using legacy application controlled TDM resource 38, and called party B is a packet-enabled telephony device coupled to switch 12 using call agent controlled packet resource 32.

To initiate the call connection process, caller A goes off-hook, or uses some other appropriate signal to alert legacy application 20 of activity, and dials a telephone number indicating called party B. Legacy application 20 collects the digits dialed by caller A and, using a routing table or some other appropriate technique, determines that a connection is required between legacy application controlled TDM resource 38 and REM 42. REM 42 emulates packet and TDM resources that legacy application 20 may not or cannot directly control. Using legacy interface 46, legacy application 20 communicates a call setup signal to switch 12 indicating caller A as the origin and REM 42 as the destination. Using REM 42 to emulate resources, switch 12 allows legacy application 20 to control packet resources as if they were TDM resources.

Based on the destination information associated with the call setup signal received from legacy application 20, switch 12 determines that a connection is requested between legacy application controlled TDM resource 38 and call agent controlled packet resource 32. Using call control interface 44, switch 12 communicates a call indication signal to call agent 18 from REM 42 indicating a request to connect with called party B. Using a routing table or some other appropriate technique, call agent 18 determines that a connection should be established between REM 42 and call agent controlled packet resource 32 associated with called party B. Call agent 18 then issues a call setup signal to switch 12 indicating REM 42 as the origin and called party B as the destination. Switch 12 connects legacy application controlled TDM resource 38 associated with caller A and call agent controlled packet resource 32 associated with called party B using switching matrix 40, and communicates a successful call setup signal to legacy application 20. Thus, a communication session is established between caller A and called party B with both call agent 18 and legacy application 20 viewing the communication session as a connection between their controlled resources.

Another example tracks a telephone call placed from the device labeled B connected to packet network 14 (caller B) and the device labeled A connected to TDM network 16 (called party A). As above, caller B is a packet-enabled telephony device coupled to switch 12 using call agent controlled packet resource 32, and called party A is a TDM telephony device coupled to switch 12 using legacy application controlled TDM resource 38.

To initiate the call connection process, caller B goes off-hook, or uses some other appropriate signal to alert call agent 18 of activity, and dials a telephone number indicating called party A. Call agent 18 collects the digits dialed by caller B and, using a routing table or some other appropriate technique, determines that a connection is required between call agent controlled packet resource 32 and REM 42. REM 42 emulates TDM resources that call agent 18 may not directly control. Using call control interface 44, call agent 18 communicates a call setup signal to switch 12 indicating caller B as the origin and REM 42 as the destination.

Based on the destination information associated with the call setup signal received from call agent 18, switch 12 determines that a connection is requested between call agent controlled packet resource 32 and legacy application controlled TDM resource 38. Using legacy interface 46, switch 12 communicates a call indication signal to legacy application 20 from REM 42 indicating a request to connect with called party A. Using a routing table or some other appropriate technique, legacy application 20 determines that a connection should be established between REM 42 and legacy application controlled TDM resource 38. Legacy application 20 then issues a call setup signal to switch 12 indicating REM 42 as the origin and called party A as the destination. Switch 12 connects call agent controlled packet resource 32 associated with caller B and legacy application controlled TDM resource 38 associated with called party A using switching matrix 40, and communicates a successful call setup signal to call agent 18. Thus, a communication session is established between caller B and called party A with both call agent 18 and legacy application 20 viewing the communication session as a connection between their controlled resources.

Telephony system 10 contemplates using similar methods to connect any resource coupled to switch 12 to any other resource coupled to switch 12, such as connections between legacy application controlled TDM resources 38 and call agent controlled TDM resources 34, and connections between call agent controlled TDM resources 34 and legacy application controlled TDM resources 38.

Figure 3:
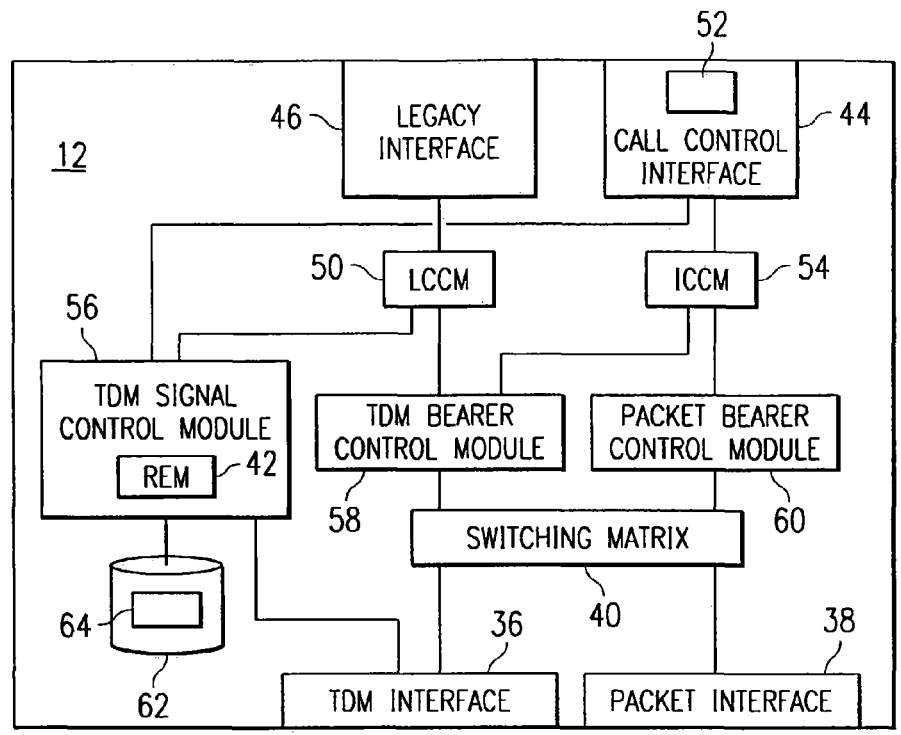
FIG. 3 is a block diagram illustrating in more detail the components of an exemplary switch in the telephony system.

FIG. 3 shows switch 12 having functional modules that are grouped into five general levels. These groupings are designed to clarify the operation of switch 12, and telephony system 10 contemplates any arrangement and/or combination of these modules and their functions. In addition, the functionality of these modules may be implemented using any suitable hardware and/or software. Accordingly, any of the functionality of telephony system 10 may be implemented using a processor to execute software stored on a computer readable medium.

The first level switch 12 provides an interface to controlling applications using legacy interface 46 and call control interface 44. The second level controls the operation of switch 12 using a legacy call control module (LCCM) 50 and an integrated call control module (ICCM) 54. The third level includes modules for controlling resources coupled to switch 12: a TDM signal control module 56, a TDM bearer control module 58, and a packet bearer control module 60. The fourth level of switch 12 includes switching matrix 40, and the fifth level provides an interface to coupled resources using TDM interface 36 and packet interface 30.

Using the interfaces on the first level, switch 12 connects to multiple controlling applications using different protocols. Legacy interface 46 provides backwards compatibility with legacy applications 20 and allows legacy applications 20 to control legacy application controlled TDM resources 38 using LCCM 50. Call control interface 44 allows call agents 18 to control call agent controlled resources using ICCM 54. In addition, a signaling backhaul 52, contained within call control interface 44, provides for signaling between call agents 18 and call agent controlled TDM resources 34. Signaling backhaul 52 may facilitate signaling by interpreting, translating between protocols, formatting, modifying, and/or otherwise interfacing communications between call agents 18 and TDM signal control module 56.

Control modules on the second level monitor and control the operations of switch 12. LCCM 50 controls TDM signal control module 56 to provide signaling between legacy applications 20 and legacy application controlled TDM resources 38. LCCM 50 also controls TDM bearer control module 58 to establish links between legacy application controlled TDM resources 38 and other resources. ICCM 54 controls TDM bearer control module 58 to establish links between call agent controlled TDM resources 34 and other resources. ICCM 54 also controls packet bearer control module 50 to establish links between packet resources and other resources.

The third level provides for signaling and control of resources coupled to switch 12. In operation, packet bearer control module 60 and TDM bearer control module 58 control switching matrix 40 to establish links between resources coupled to switch 12. TDM bearer control module 58 monitors and controls the operation of TDM interface 36 and switching matrix 40 to establish links involving TDM resources. Packet bearer control module 60 monitors and controls the operation of packet interface 30 and switching matrix 40 to establish links involving packet resources. In addition, TDM signal control module 56 provides for signaling between controlling applications and their controlled TDM resources. In a particular embodiment, TDM signal control module 56 also contains REM 42 that emulates TDM resources coupled to switch 12.

REM 42 emulates resources by receiving communications from one controlling application and routing those communications to another controlling application. REM 42 routes these signals when a controlling application attempts to control a resource coupled to switch 12 that is controlled by another controlling application. Routing may include interpreting, translating between protocols, formatting, modifying, and/or other appropriate steps to allow a controlling application, using its standard protocol, to establish connections involving resources that it does not control. Thus REM 42 provides a signal routing link allowing a controlling application to control connections between its resources and resources controlled by other applications without modifying the interfaces to these controlling applications.

For example, legacy applications 20 control call agent controlled resources as if those resources were legacy application controlled TDM resources, and call agents 20 control legacy application controlled resources as if those resources were call agent controlled TDM resources. To legacy application 20 all of the packet and TDM resources appear as legacy application controlled TDM resources 38, and to call agent 18, all TDM resources appear as call agent controlled TDM resources 34. However, telephony system 10 contemplates using REM 42 to interface between any different protocols to allow any number of controlling applications to control resources controlled by multiple applications. In addition, the functions of the modules described above may be separated and/or combined into any suitable controller(s) implemented using hardware and/or software.

The operation of a particular embodiment of switch 12 can be understood by describing the signals associated with the specific example discussed above for a telephone call from caller A (associated with legacy application controlled TDM resource 38) to called party B (associated with call agent controlled TDM resources 34). Initially, caller A communicates a call indication signal to switch 12 specifying called party B as the destination. The call indication signal is communicated through TDM interface 36, TDM signal control module 56, LCCM 50, and legacy interface 46 to legacy application 20. It should be noted that telephony system 10 contemplates each module on a specific route translating a signal from one transmission protocol to another transmission protocol to facilitate proper communications. In response to receiving the call indication from caller A, legacy application 20, using a routing table or other suitable technique, determines that the target address is legacy application controlled TDM resource 38 coupled to switch 12 with the address REMB. The address REMB is a "virtual", temporary, or intermediate address indicating REM 42 to represent called party B from the perspective of legacy application 20. Thus legacy application 20 communicates a call setup signal to switch 12 requesting a connection between address A and address REMB. LCCM 50, in response to the call setup request, attempts to "ring," or otherwise indicate a call request to, address REMB using TDM signal control module 56.

REM 42, within TDM signal control module 56, receives this signal and, using signaling backhaul 52, communicates a call indication signal to call agent 18 specifying address REMA as the origin and requesting a connection to called party B. The address REMA is a "virtual", temporary, or intermediate address indicating REM 42 to represent caller A from the perspective of call agent 18. Call agent 18, using a routing table or other suitable technique, determines that the target address of the call indication signal is address B (the actual address of called party B). Call agent 18 communicates a call setup signal to switch 12 specifying address REMA as the origin and address B as the destination. Upon successfully establishing a connection between switch 12 and called party B, TDM signal control module 56 receives a successful setup signal indicating a successful setup between address REMA and address B.

REM 42, within TDM signal control module 56, receives this signal and generates a new successful call setup signal indicating a successful setup between address A and address REMB and communicates this signal to legacy application 20. Call agent 18 and/or legacy application 20 use TDM bearer control module 58 to link legacy application controlled TDM resource 38 associated with caller A and call agent controlled packet resource 32 associated with called party B using switching matrix 40. Thus the connection can be viewed in the signaling plane as two connections, A to REMB and REMA to B, and in the switching plane as a single connection between A and B.

Although this particular example uses specific addresses and signaling techniques, telephone system 10 contemplates establishing connections between resources coupled to switch 12 using any suitable protocols to communicate with controlling applications. Moreover, REM 42 may route any signals necessary to allow a controlling application to establish connections between its controlled resources and other resources coupled to switch 12 as though all those resources were under the direct control of that controlling application.

In addition, REM 42 may use any method necessary to route signals between controlling applications. In a particular embodiment, REM 42 detects signals originating from legacy application controlled TDM resources 38 with destinations indicating call agent controlled TDM resources 34 or call agent controlled packet resources 32, and detects signals originating from call agent controlled TDM resources 34 or call agent controlled packet resources 32 with destinations indicating legacy application controlled TDM resources 38. Once detected, these signals may be routed between controlling applications. Routing these signals may include any steps necessary to: interpret the signal, transform the signal between protocols, modify the underlying signal, and/or modify the origin and destination addresses. For example, a call setup signal from legacy application 20 requesting a connection between caller A and REM 42 must be routed to call agent 18. This includes using a different protocol and changing the signal from a call setup signal to a call indication signal.

Thus control of all resources coupled to switch 12 may be accomplished through a "virtual" resource, REM 42. However, telephony system 10 contemplates switch 12 using any technique for allowing multiple controlling applications to connect resources coupled to switch 12, controlled by different applications, as if they controlled all of those resources.

Figure 4:
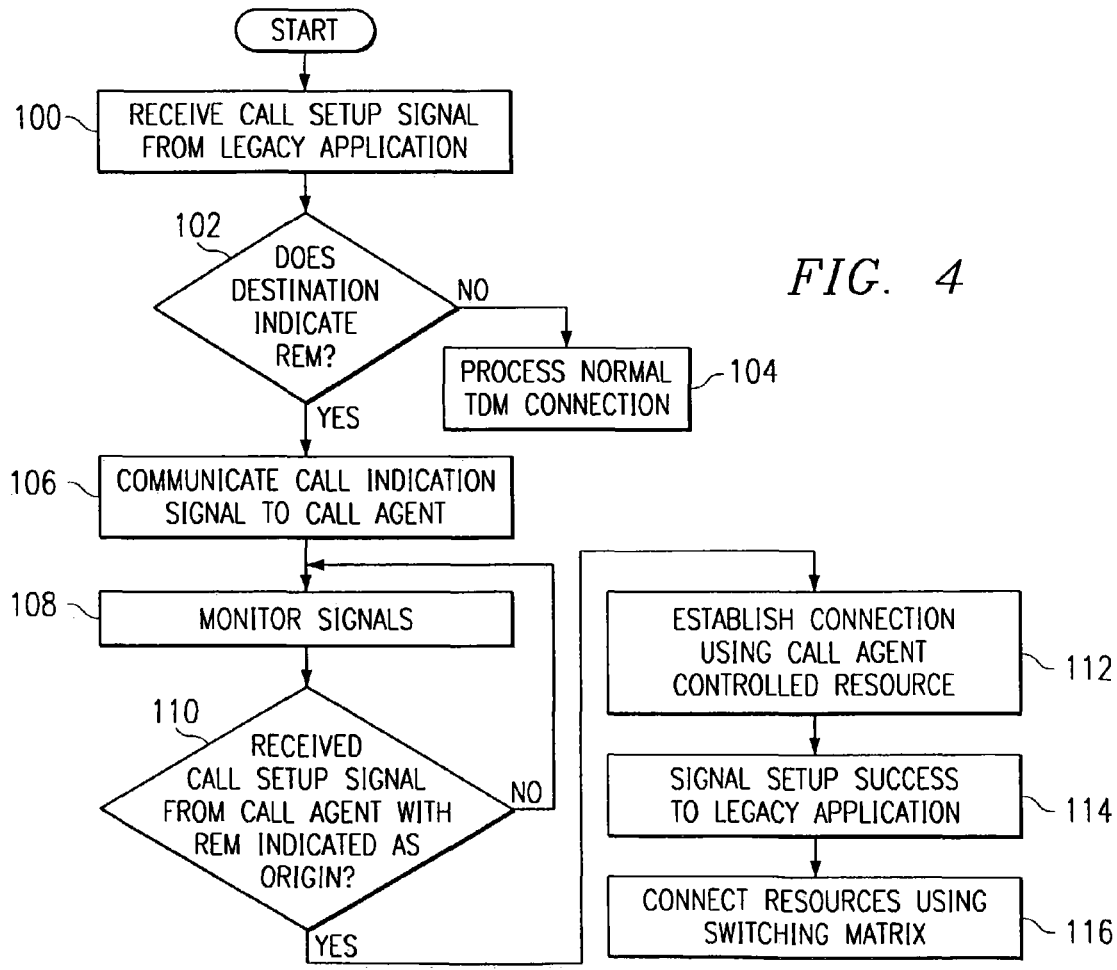
FIG. 4 is a flowchart of a method for connecting a legacy application controlled resource to a packet resource.

FIG. 4 is a flowchart illustrating the operation of switch 12 when legacy application 20 communicates a call setup signal. Switch 12 receives a call setup signal from legacy application 20 at step 100, and determines whether the call setup signal specifies a destination indicating REM 42 at step 102. If not, this call setup signal represents a request to connect two legacy application controlled TDM resources 38, and switch 12 processes the signal as a normal TDM connection at step 104.

If the destination of the call setup signal does indicate REM 42, switch 12, using signaling backhaul 52, communicates a call indication signal to call agent 18 at step 106. Switch 12 monitors signals from controlling applications at step 108. Switch 12 determines whether call agent 18 has communicated a call setup signal indicating REM 42 as the origin at step 110. If not, switch 12 continues monitoring of signals at step 108. If switch 12 has received a call setup signal from call agent 18 indicating REM 42 as the origin, switch 12 establishes a connection to call agent controlled packet resource 32 at step 112. Switch 12 communicates a successful call setup signal to legacy application 20 at step 114, and establishes a connection between legacy application controlled TDM resource 38 and call agent controlled packet resource 32 using switching matrix 40 at step 116. Using a similar procedure, legacy application 20 may establish a connection between legacy application controlled TDM resources 38 and call agent controlled TDM resources 34.

Figure 5:
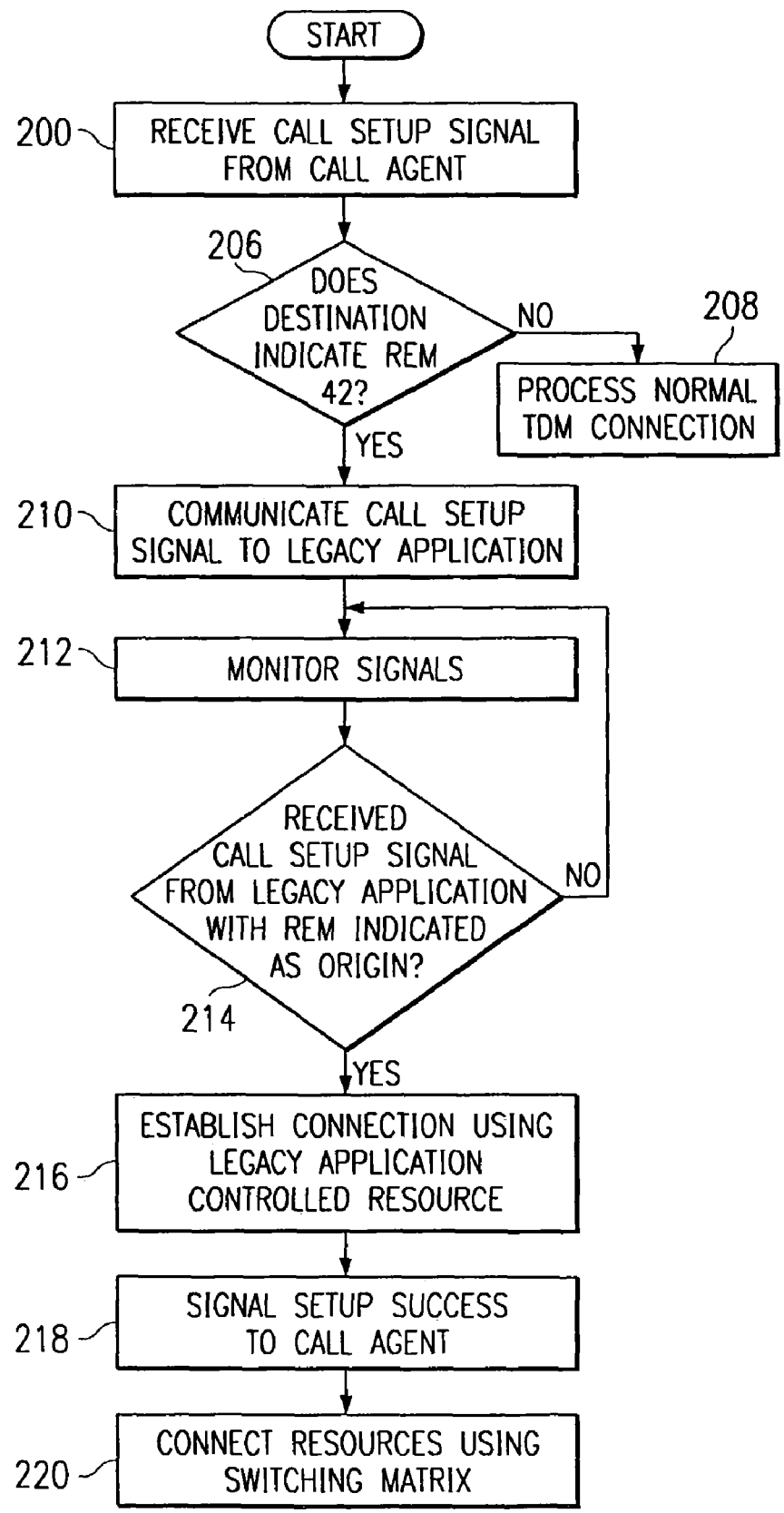
FIG. 5 is a flowchart of a method for connecting a packet resource to a legacy application controlled resource.

FIG. 5 is a flowchart illustrating the operation of switch 12 for connecting resources in response to a request from call agent 18 to connect call agent controlled packet resource 32 to a destination. Switch 12 receives a connection request signal at step 200, and determines whether the destination address indicates REM 42 at step 206. If not, switch 12 processes the request as a normal connection request between controlled resources of call agent 18.

If the destination indicates REM 42, switch 12 communicates a call indication signal to legacy application 20 specifying REM 42 as the origin at step 210. Switch 12 monitors signals from controlling applications at step 212, and determines whether a call setup signal specifying REM 42 as the origin has been received from legacy application 20 at step 214. If not, switch 12 continue monitoring of communications at step 212. If switch 12 receives a proper call setup signal from legacy application 20, switch 12 establishes a connection using legacy application controlled TDM resource 38 at step 216. Switch 12 communicates a setup success signal to call agent 18 at step 218, and connects call agent controlled packet resource 32 and legacy application controlled TDM resource 38 using switching matrix 40 at step 220. Using a similar procedure, call agent 20 may establish a connection between call agent controlled TDM resources 34 and legacy application controlled TDM resources 38.

The preceding flowcharts illustrate the operation of particular embodiments of switch 12, and telephony system 10 contemplates using any method, signaling protocols, or other suitable techniques to connect resources coupled to switch 12 controlled by multiple controlling applications as if those resources were controlled by each of the controlling applications.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A hybrid telecommunications switch comprising:
   a switching matrix;
   a first resource coupled to the switching matrix and controlled by a first application;
   a second resource coupled to the switching matrix and controlled by a second application;
   a resource emulation module operable to identify a first virtual address corresponding to the first resource and a second virtual address corresponding to the second resource, the resource emulation module further operable to receive a call request from the first application specifying the first resource and the second virtual address and, in response to the call request, to generate a call indication specifying the first virtual address and the second resource and to communicate the call indication to the second application; and
   a switching matrix controller operable to connect the first resource and the second resource using the switching matrix.

2. The hybrid telecommunications switch of claim 1, wherein the resource emulation module is further operable to receive a first successful setup message from the second application specifying the second resource and the first virtual address and, in response to the first successful setup message, to generate a second successful setup message specifying the second virtual address and the first resource and to communicate the second successful setup message to the first application.

3. The hybrid telecommunications switch of claim 1, further comprising:
   a first call control module operable to receive an initial call indication and to forward the call indication to the first application, the first call control module further operable to receive a setup request from the first application and to forward the setup request to the resource emulation module as the call request; and
   a second call control module operable to receive the call indication from the resource emulation module and to forward the call indication to the second application, the second call control module further operable to receive a second call setup request from the second application and to forward the second call setup request to the resource emulation module.

4. The hybrid telecommunications switch of claim 3, wherein the first call control module is further operable to communicate with the first application using a first control protocol, and the second call control module is further operable to communicate with the second application using a second control protocol.

5. The hybrid telecommunications switch of claim 1, wherein the first application comprises a legacy application, and the second application comprises a call agent.

6. The hybrid telecommunications switch of claim 1, further comprising:
a plurality of time division multiplexed resources coupled to the switching matrix and controlled by the first application; and
a plurality of packet-based resources coupled to the switching matrix and controlled by the second application.

7. The hybrid telecommunications switch of claim 6, wherein the first resource is one of the time division multiplexed resources, and the second resource is one of the packet-based resources.

8. The hybrid telecommunications switch of claim 6, further comprising a second plurality of time division multiplexed resources controlled by the second application.

9. A method for integrated telephony switching comprising:
receiving a call request from a first application specifying a first resource coupled to a switching matrix and a second virtual address, wherein the first application controls the first resource;
identifying a second resource coupled to the switching matrix that corresponds to the second virtual address;
determining a first virtual address corresponding to the first resource;
generating a call indication specifying the first virtual address and the second resource; and
communicating the call indication to a second application that controls the second resource.

10. The method of claim 9, further comprising:
receiving a first successful setup message from the second application specifying the second resource and the first virtual address;
in response to the first successful setup message, generating a second successful setup message specifying the second virtual address and the first resource;
communicating the second successful setup message to the first application; and
connecting the first resource and the second resource using the switching matrix.

11. The method of claim 9, further comprising:
receiving an initial call indication from a telephony device coupled to the first resource; and
forwarding the call indication to the first application.

12. The method of claim 9, further comprising communicating with the first application using a first control protocol and communicating with the second application using a second control protocol.

13. The method of claim 9, wherein the first application comprises a legacy application, and the second application comprises a call agent.

14. The method of claim 9, wherein the first resource is a time division multiplexed resource, and the second resource is a packet-based resource.

15. Software for integrated telephony switching, the software embodied in a computer readable medium and operable when executed to perform the steps of:
receiving a call request from a first application specifying a first resource coupled to a switching matrix and a second virtual address, wherein the first application controls the first resource;
identifying a second resource coupled to the switching matrix that corresponds to the second virtual address;
determining a first virtual address corresponding to the first resource;
generating a call indication specifying the first virtual address and the second resource; and
communicating the call indication to a second application that controls the second resource.

16. The software of claim 15, further operable when executed to perform the steps of:
receiving a first successful setup message from the second application specifying the second resource and the first virtual address;
in response to the first successful setup message, generating a second successful setup message specifying the second virtual address and the first resource;
communicating the second successful setup message to the first application; and
connecting the first resource and the second resource using the switching matrix.

17. The software of claim 15, operable when executed to perform the steps of:
receiving an initial call indication from a telephony device coupled to the first resource; and
forwarding the call indication to the first application.

18. The software of claim 15, operable when executed to perform the steps of communicating with the first application using a first control protocol and communicating with the second application using a second control protocol.

19. The software of claim 15, wherein the first application comprises a legacy application, and the second application comprises a call agent.

20. The software of claim 15, wherein the first resource is a time division multiplexed resource, and the second resource is a packet-based resource.

21. A hybrid telecommunications switch comprising:
means for receiving a call request from a first application specifying a first resource coupled to a switching matrix and a second virtual address, wherein the first application controls the first resource;
means for identifying a second resource coupled to the switching matrix that corresponds to the second virtual address;
means for determining a first virtual address corresponding to the first resource;
means for generating a call indication specifying the first virtual address and the second resource; and
means for communicating the call indication to a second application that controls the second resource.

* * * * *